Jan. 31, 1933. W. G. RUECKART ET AL 1,895,821
CLUTCH MECHANISM FOR USE IN MOTOR VEHICLE TRANSMISSIONS
Filed Sept. 22, 1930
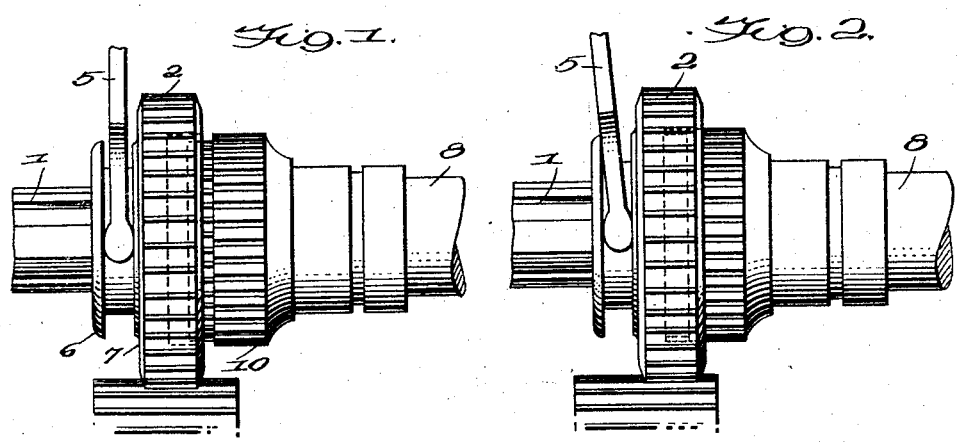
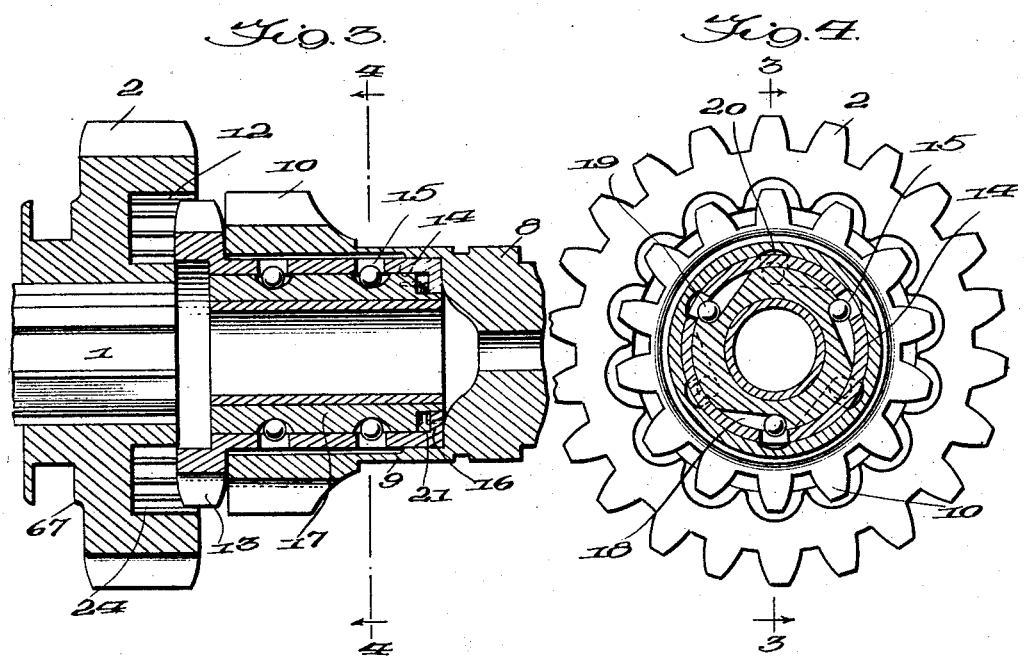
Inventors
W. G. Rueckart
E. B. Anderson
By Mason & Mason
Attorneys Patented Jan. 31, 1933

1,895,821

UNITED STATES PATENT OFFICE

WALTER G. RUECKART AND ELMER B. ANDERSON, OF BIG SPRING, TEXAS

CLUTCH MECHANISM FOR USE IN MOTOR VEHICLE TRANSMISSIONS

Application filed September 22, 1930. Serial No. 483,654.

This invention relates to clutch mechanism for motor vehicles and more particularly to a construction and arrangement of clutch transmission elements to enable the vehicle to be automatically disconnected from or connected with the clutch under certain relative speed conditions.

A particular feature of the invention is found in a novel arrangement of parts whereby the sliding gear which is splined to the drive shaft may be shifted to a position whereby the power is applied through an overrunning clutch to the driven shaft of a vehicle and upon further movement of such sliding gear, a direct and positive connection is established between the power mechanism and the driven shaft for propelling the vehicle. The construction and arrangement of parts referred to which constitutes an important feature of the invention embodies a simple and compact organization of the several elements of the transmission, which is free from complications, positive and reliable in its action, and economical to manufacture and assemble.

The particular form of the invention herein illustrated will be better understood from the following detailed description, when considered in connection with the accompanying drawing, in which:—

Fig. 1 is a side elevation of the several clutch elements, showing the movable or sliding gear in its first position;

Fig. 2 is a like view, showing the same part in its second position;

Fig. 3 is a sectional view on the line 3—3, Fig. 4, and

Fig. 4 is a sectional view on the line 4—4, Fig. 3.

The invention is of particular importance in connection with ratchet clutch transmission devices of the class that permit the vehicle to be freed from connection with the motor when a speed greater than the speed of the motor shaft has been acquired by the vehicle wheels, to which the driven member of the transmission is connected, the driving connection between the vehicle wheels and the motor being automatically restored as soon as the conditions referred to are reversed. That is, when the driving member has a speed of rotation which is greater than the driven member connected with the vehicle wheels, the vehicle will be driven in the usual manner. When coasting down hill, or under any conditions where the driven member and vehicle wheels rotate faster than the speed of the driving member, the so-called free-wheeling condition of the parts is automatically initiated, the parts being restored when such relative speed conditions are reversed. Furthermore, while the connection between the driving and driven elements of the transmission is such as to permit automatic free-wheeling in one position of the shifting gear, a further movement of the said gear in the same direction along the shaft on which it slides will serve to positively connect such gear with the driven member, whereby the motor will positively drive the vehicle, regardless of the relative speeds of the driving and driven parts, and the motor will be permitted to act as a brake when coasting, as in the conventional sliding gear transmissions used generally in automobiles at the present time.

Referring to the drawing which illustrates sufficient parts of a clutch transmission to enable the invention to be understood, the numeral 1 denotes the motor shaft, and 2 a toothed gear which is splined to the shaft 1 for sliding movement thereon by a fork 5 which is operative to shift the gear through a groove between collars 6 and 7. The shaft 8 is connected with the wheels of a motor vehicle, in any preferred or usual manner, as through a differential, and said shaft is provided with a recess 9 externally toothed at 10. The sliding transmission gear 2 is provided in its rear face with a circumferential recess 24 surrounded by a plurality of teeth 12. The recess containing the teeth 12 is of sufficient size to slide over and cause teeth 12 to mesh with the teeth of a toothed clutch member 13 which is provided with a sleeve 14 having a plurality of apertures 15, and the inner end of the sleeve 14 has an inturned annular flange 16. Enclosed within the sleeve 14 is a cylindrical ball-carrying clutch member 17 provided with a plurality of inclined grooves 18, which contain clutch balls 19. The grooves 18, when the parts are in the position shown in Fig. 4, have their deepest portions opposite the apertures 15 and in such position the sleeve 14 is unclutched from the inner surface of the walls defining recess 9. The walls of the recess 9 are provided with a plurality of longitudinally extending grooves or depressions 20 into which the balls 19 are forced when the driving element 13 is rotated, the clutch member 17 being then in a position where the shallowest portion of its grooves 18 are opposite the apertures 15, thereby effecting clutching engagement between the sleeved extension 14, and the interior surface of the recess 9. When the parts occupy such positions the shaft 8 of the vehicle is driven positively from the power shaft 1 through the gear 2 and toothed member 13, and the elements of the clutch between the sleeve 14 and teeth 10.

A spiral spring 21 is located in a recess between the flange 16 and the inner end of the clutch member 17, and acts normally to restore the clutch parts to the position shown in Fig. 4 when permitted to do so.

In the operation of the device, when the ordinary gear shift lever is moved to establish direct driving connection between the motor and the vehicle, the gear 2 is slid to the right until the internal teeth 12 mesh with the teeth 13, and upon rotation of the latter and its sleeve 14, the balls 19 will establish clutching engagement between the parts 14 and 10, the inertia of the clutch member 17 being sufficient to enable the sleeve 14 to move relatively to such clutch member in the initial movement of the member 13, the balls 19 moving outwardly into the grooves 20, thereby locking the parts 10 and 14 together. The power of the motor is then directly applied through the clutch and transmission to the shaft 8 which drives the vehicle in "high" speed. In the event that the vehicle outruns the speed of rotation of the member 13, shaft 8 and member 10 moving faster than sleeve 14 will permit a reversal of movement of the clutch member 17, restoring the parts to the position shown in Fig. 4 and permitting the balls to drop into the deeper portions of the grooves 18, which will now be opposite the apertures 15. This will unclutch the vehicle from the driving member 14 and permit the vehicle to coast, or to run free from its motor-driving mechanism, but as soon as the speed of the vehicle falls below that of the motor and toothed driving member 13 and its sleeve 14, the clutch will become operative again and the vehicle be driven directly from the motor. The change from the direct positive driving connection between the motor and vehicle, and the freedom from such connection is, as will be seen, effected automatically, being entirely controlled by the relative speed of the vehicle and motor.

In the event that it is desired to dispense with the automatic operation of the clutch, an additional movement of the sliding gear 2 to the right, so that the teeth 12 will engage with the teeth 10, as shown in Fig. 2, will effect positive engagement between the driving and driven parts, whereby the vehicle will be directly connected with the motor at all speeds of the vehicle relatively to the motor, thus permitting the motor to act as a brake in descending heavy grades, or wherever desired.

No claim is made herein to the construction of the one-way or ball clutch per se, as the same is shown, described and claimed in our companion application filed of even date herewith, Serial No. 483,655.

The right is reserved to make such changes in the details of construction or relative arrangement of the several parts as are contemplated by the following claims.

What we claim is:—

1. In a transmission mechanism, the combination of a driving shaft, an internally toothed gear slidable thereon, a driven shaft provided with a recess and an externally toothed clutch member, a toothed clutch member located intermediate said internally and externally toothed members provided with a sleeve rotatable in said recess, an overrunning clutch constructed and arranged for automatically clutching and unclutching said intermediate clutch member and driven shaft in accordance with variations in the relative speeds of said member and shaft, said intermediate and externally toothed clutch members being constructed for successive engagement by said internally toothed gear.

2. In a transmission mechanism for motor vehicles, the combinaiton with a driving shaft, of a driven shaft having an internal recess and teeth, an independently rotatable toothed clutch member having a sleeve telescopically received in said recess, overruning clutch parts located between and constructed to automatically clutch and unclutch said driven shaft and member, and a gear slidable upon said drive shaft and provided with a recess having internal teeth and constructed and arranged when moved along said drive shaft to cause said internal teeth to engage successively with the teeth on said first-mentioned toothed members.

3. A transmission mechanism having, in combination, a drive shaft, a gear slidable thereon and provided with an internal recess in its face having radially disposed teeth therein, a driven shaft provided upon its exterior with a plurality of teeth and having an internal recess, a sleeve rotatable in said recess and having an annular lateral portion provided with external teeth, a free-running automatic clutch arranged between said sleeve and driven shaft, said driven shaft being adapted for movement to cause its internal radial teeth to engage in succession one, or both of said teeth on said sleeve and driven shaft.

In testimony whereof we have hereunto set our hands this 17th day of September A. D. 1930.

WALTER G. RUECKART.
ELMER B. ANDERSON.